INVENTORS.
Ralph L. Beyerstedt
Julius C. Laegeler, Jr.
Paul O. Pippel
Atty.

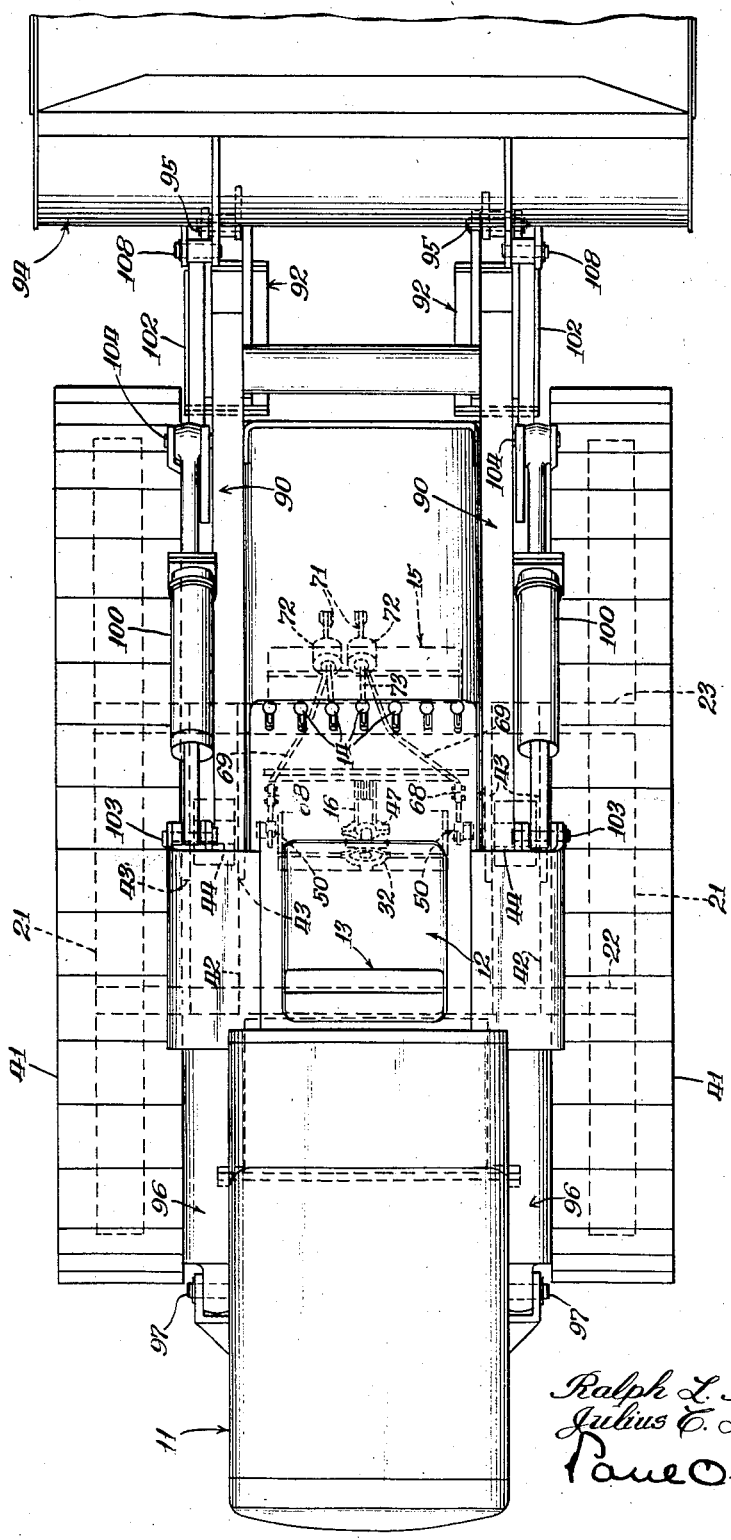

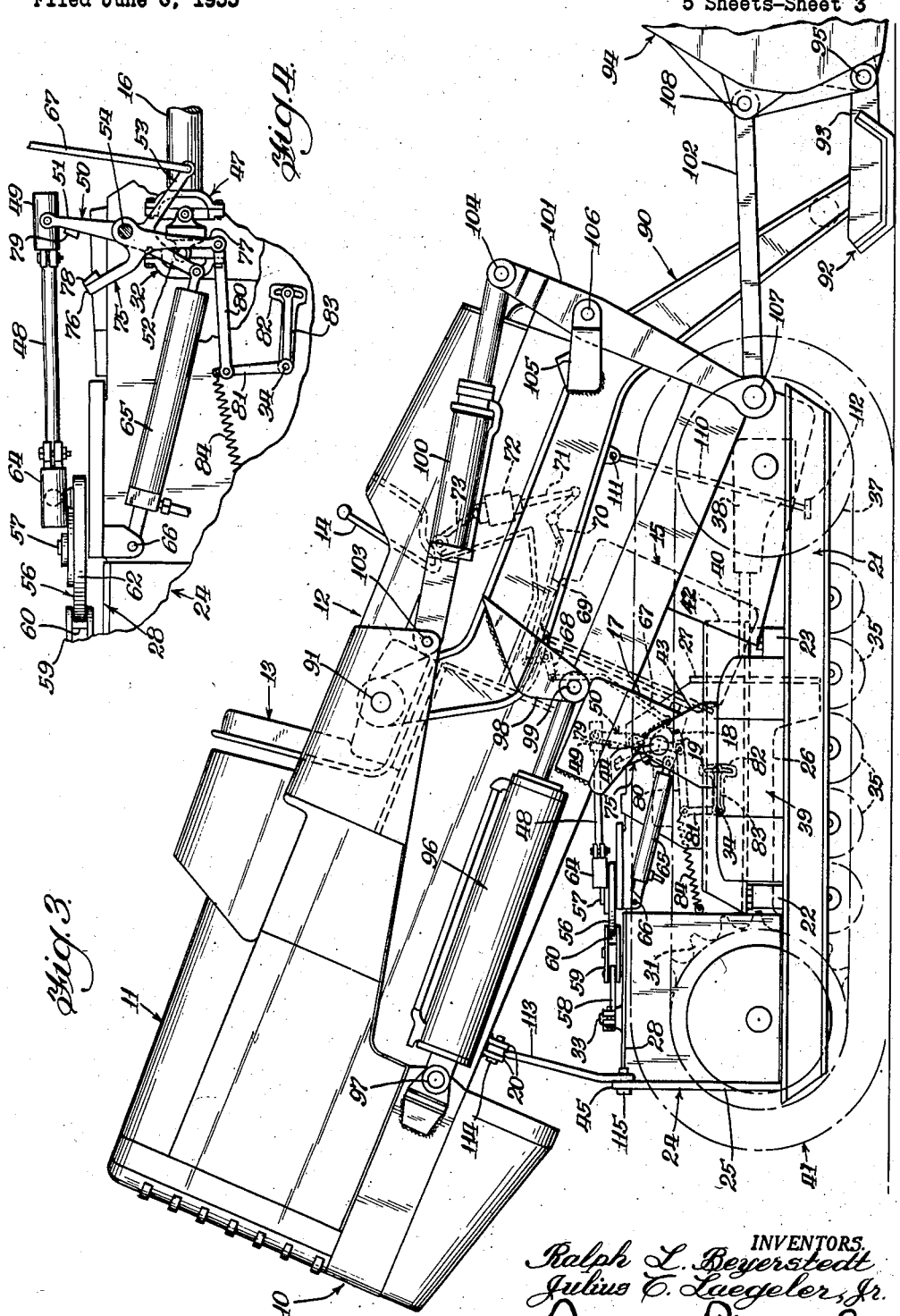

Aug. 5, 1958   R. L. BEYERSTEDT ET AL   2,846,096
TRACTOR LOADERS
Filed June 6, 1955   5 Sheets-Sheet 4

INVENTORS.
Ralph L. Beyerstedt
Julius C. Laegeler Jr
Paul O. Pippel
Atty.

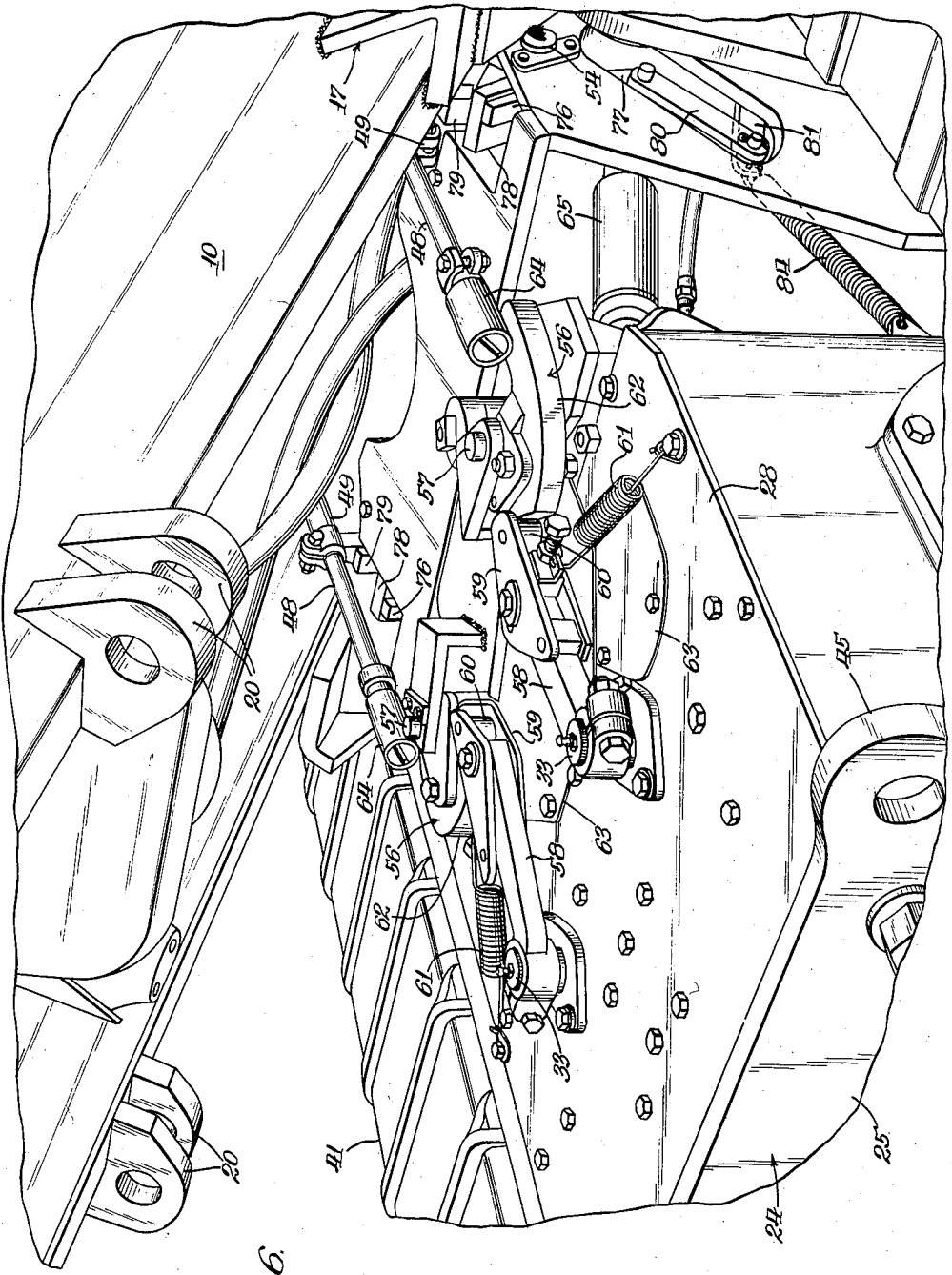

United States Patent Office 2,846,096
Patented Aug. 5, 1958

2,846,096
TRACTOR LOADERS

Ralph L. Beyerstedt and Julius C. Laegeler, Jr., Libertyville, Ill., assignors to The Frank G. Hough Co., a corporation of Illinois Application June 6, 1955, Serial No. 513,246

16 Claims. (Cl. 214—140)

This invention relates to tractor loaders and more specifically to an improved arrangement of the various components thereof to produce a tractor loader which is easy to operate and service.

In the art of tractor loaders having a bucket or earth-working tool extending forwardly of the tractor, it has been found that the type of tractor having the operator's station or compartment disposed forwardly of the tractor engine results in a tractor loader having many operating efficiencies over a front end tractor loader wherein the operator's compartment is disposed rearwardly of the engine compartment. In the construction and use of these front end tractor loaders, wherein the operator's station is disposed forwardly of the tractor, a number of problems have arisen. Firstly, due to the size and weight of the various components of the tractor loader such as the body carrying the engine and operator's compartment, the earth-working tool, and the traction means, the interconnection and relative disposition of these elements is critical and a properly balanced unit has been difficult to obtain. Secondly, it is usually necessary that the traction means carry elements such as the clutches and brakes for the traction means and these in turn must usually be positioned closely beneath the body of the tractor. Since the brakes and clutches of the tractor must be periodically serviced, their noted position has rendered servicing a difficult, time consuming and expensive task.

It is the object of the present invention to provide an arrangement of the various necessary elements of a front end type tractor loader wherein proper balance of the entire loader is achieved, and wherein access may be readily had to any mechanisms carried by the traction means beneath the body of the tractor.

It is a further object of the present invention to provide a front end type tractor loader wherein the body of the tractor may be tilted relative to the traction means to permit convenient access to any clutch or brake mechanisms carried by the traction means.

Other objects and the features of the present invention will be apparent upon a perusal of the following specification and drawings of which:

Figure 2 is a top plan view of the structure shown in Figure 1;

Figure 3 is a side elevational view of the structure shown in Figure 1 with the body of the tractor tilted to one position;

Figure 4 is a fragmentary view of a portion of the structure shown in Figures 1 and 3;

Figure 6 is a partial three-quarter perspective view of the clutch and brake mechanisms carried between the track frames.

The present embodiment is the preferred embodiment but it is to be understood that changes can be made in the present embodiment by one skilled in the art without departing from the spirit and scope of this invention.

For a detailed description of the present invention reference is made to the drawings. The tractor loader of the subject invention may be said to generally comprise three components, namely, the body of the tractor, the traction means of the tractor, and the earth working tool means.

Figure 1:
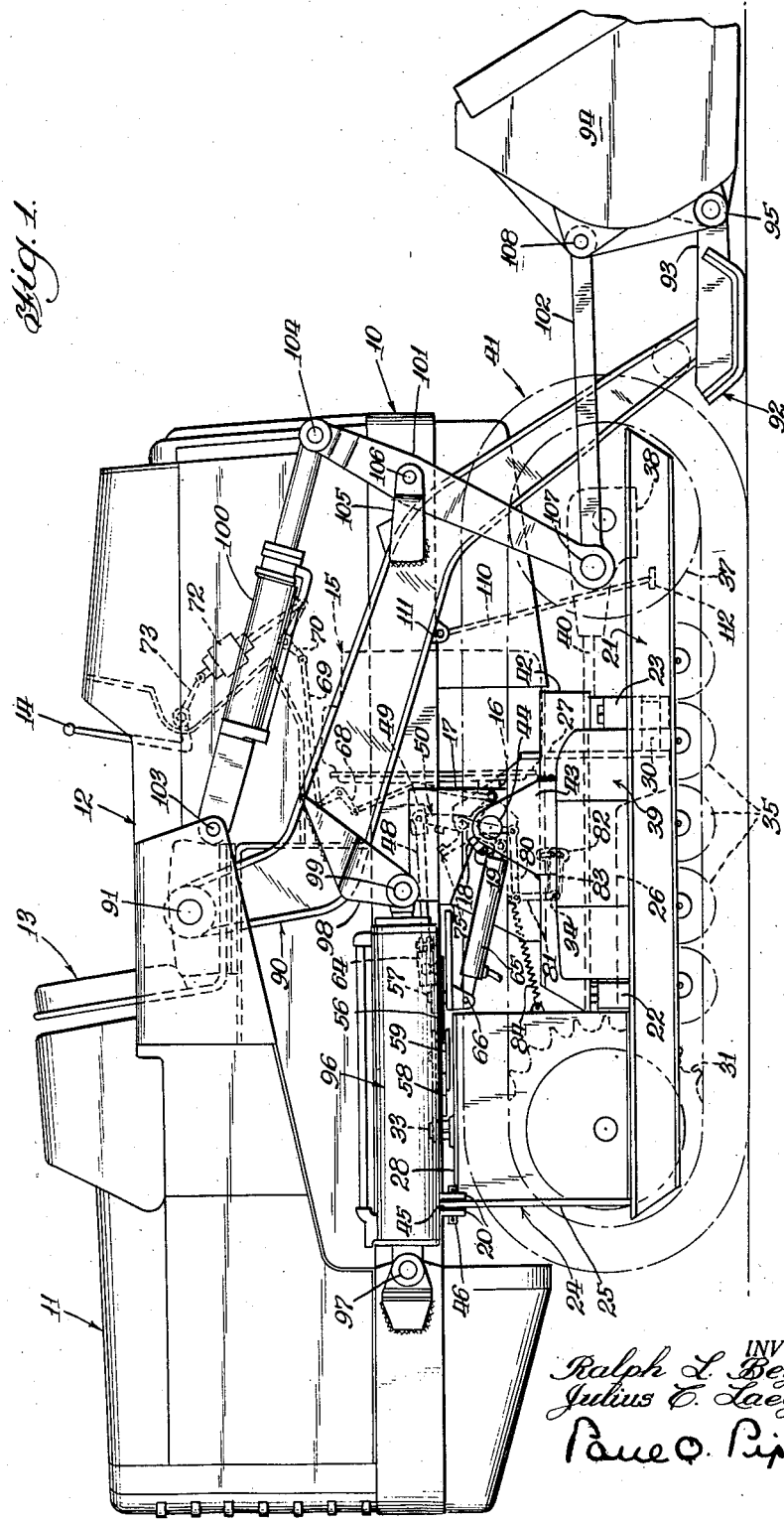
Figure 1 is a side elevational view of one embodiment of a tractor loader constructed according to the present invention.

The body of the tractor comprises a longitudinal chassis or frame member 10 to which the other members of the body are mounted. An engine compartment 11 having an engine disposed therein is mounted on the frame 10 substantially at the rear thereof. Forwardly of the engine compartment 11 is an operator's compartment 12 having a forwardly facing seat 13 mounted therein and the various necessary control elements such as levers 14. A transmission 15 is further carried by the frame 10 and is operatively connected by means (not shown) to the engine in the engine compartment 11. The details of the engine and the transmission 15 are not shown since these may be of any suitable type well known in the art. Importantly of the transmission 15, is the output or driven shaft 16 which may be easily seen in Figure 4. At each longitudinal side of the frame 10 substantially at the center thereof is mounted a pair of depending brackets 17. To each bracket 17 is secured one half of a bearing 18. The bearings 18 are positioned along a common axis transversely of the body of the tractor and that axis lies forwardly and below the center of gravity of the body. The bearings 18 need not be positioned strictly as described, however, when so positioned and when the earth-working tool is mounted to the body, a well-balanced unit is achieved. Another half of a bearing 19 is provided for each of the bearings 18, and means are provided for securing the halves together to form a complete bearing on each side of the body of the tractor. The bearings 18 and 19 mate or cooperate along a surface lying in a plane which is inclined upwardly and rearwardly of the body of the tractor when the body of the tractor is disposed substantially horizontally as can be seen in Figure 1. The bearings 18 and 19 provide the primary supporting means for the body of the tractor on the traction means. The rearward portion of each side of the frame 10 is provided with a clevis 20 as can be seen in Figure 6. The cooperation of the clevises 20 and the bearings 18 and 19 with the traction means will be described below.

Figure 5:
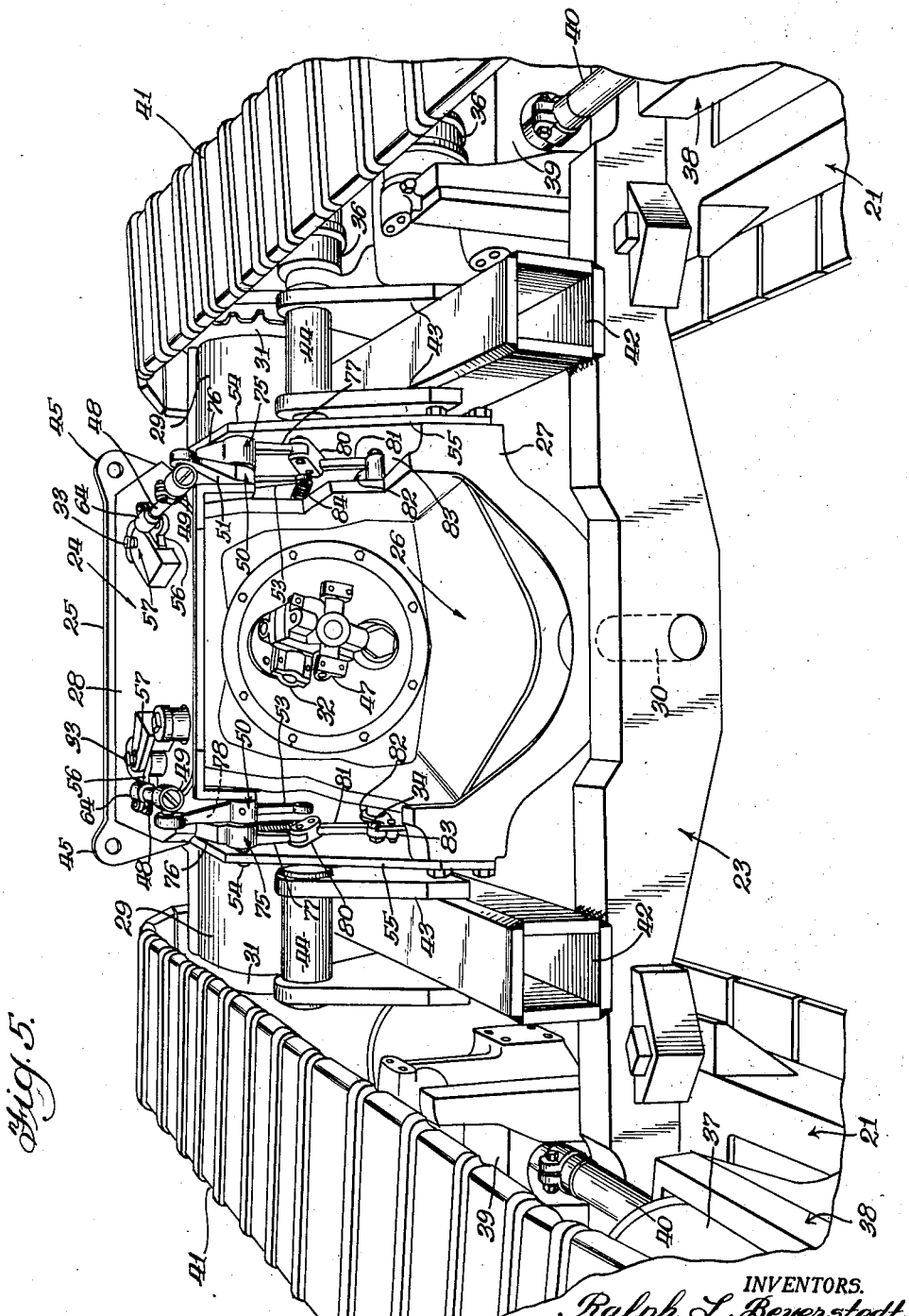
Figure 5 is a partial perspective view of the traction means with the body of the tractor removed and looking from the forward end of the traction means.

The traction means of the present embodiment comprises a crawler track mechanism. The crawler track mechanism comprises a pair of spaced apart track frames 21 to which the other portions or elements of the traction means are mounted. The track frames 21 are interconnected by a pair of transverse support bars 22 and 23. A final drive housing 24 is also mounted to the track frames 21. The final drive housing 24 which may be of any type well known in the art comprises a cast or fabricated housing having a rear wall 25, a bottom wall 26, a front wall 27, a removable cover 28, and a pair of axially spaced members 29. The axially spaced members 29 are mounted to the track frames substantially at the rear ends thereof to support the rear portion of the final drive housing 24. The forward end of the final drive housing 24 is supported by a pin 30 which is mounted through the front wall 27 of the final drive housing 24 and is journaled through the front transverse support member 23. The axially spaced members 29 carry a shaft upon which the driving sprockets 31 are mounted. Power input to the final drive housing 24 is through a shaft to which the universal joint 32 is mounted as can be seen in Figures 4 and 5. Power train means (not shown) are provided within the final drive housing 24 between the input to the final drive housing and the driving sprockets 31. Clutch and brake mechanisms (not shown) are also mounted within the final drive housing 24 in cooperation with the power train therein to provide selectively operable means to control the transmission of power to the driving sprockets 31. The various described elements which are within the final drive housing 24 may be easily serviced therein when the cover 28 is unbolted and removed from the final drive housing 24. Inspection covers 63 are also provided through the cover 28 for minor adjustments and inspection within the final drive housing 24. The clutches within the final drive housing are operated through the shafts 33 which are operatively connected thereto. The linkage arrangements for rotating the shafts 33 to operate the clutches will be described below. The brakes within the final drive housing 24 are operated through the shafts 34 which are operatively connected thereto. The linkages for causing rotation of the brake shafts 34 will be described below. Each of the track frames 21 is further provided with a plurality of lower track rollers 35 which are rotatively mounted on the underside thereof. Each of the track frames 21 are further provided with a plurality of upper track rollers 36 which are rotatively mounted thereto as can be seen in Figure 5. A pair of front idler wheels 37 are rotatively mounted in a pair of members 38 which are in turn slidably mounted on the track frames 21. The members 38 are connected to a pair of track tensioning assemblies 39 mounted on the track frames 21 through a pair of rods 40. A pair of continuous tracks 41 of any type well known in the art are mounted about the sprocket wheels 31, the lower rollers 35 and the upper rollers 36 and the front idler wheels 37.

A pair of beams or box channel members 42 are provided. The beams 42 are secured as by welding to the transverse support members 22 and 23. The beams 42 are positioned on top of the transverse support members 22 and 23 substantially adjacent to the track frames 21 as can be seen in Figure 5. A pair of substantially triangularly shaped flanges 43 are secured in a spaced apart relationship to each other to each of the beams 42. The upper end of each pair of flanges 43 is provided with a stub shaft 44 secured therebetween. The stub shafts 44, the pairs of flanges 43, and the beams 42 are formed of a size having sufficient strength to support the weight of the body of the tractor and the load of the earth-working tool, and these elements are so positioned that the stub shafts 44 lie substantially midway between the axes of the sprockets 31 and the front idler wheels 37 and substantially adjacent the upper section of the tracks 41. The stub shafts 44 are further formed to have a diameter substantially equal to the diameter of the bearings formed by the bearing members 18 and 19 previously described.

The body of the tractor is mounted on the traction means by positioning the body so that the bearing elements 18 cooperate with the stub shafts 44, permitting the bearing elements 19 to be positioned about the lower portion of the stub shafts 44 and fastened to the bearing elements 18. When the body of the tractor is mounted in this manner to the traction means, the body is swingable or pivotable about the axis through the stub shafts 44. The body of the tractor is limited by the final drive housing 24 from any substantial pivotal movement relative to the traction means in a counter-clockwise direction as viewed in Figure 1, however, the body of the tractor is pivotable a substantial amount in a clockwise direction as viewed in Figure 1, wherein the forward portion of the body will move downward between the track frames 21 as can be seen in Figure 3. The back wall 25 of the final drive housing 24 is formed to have a pair of flanges 45 thereon at the upper side edges thereof and the flanges 45 have openings therethrough which are aligned with the openings in the clevis 20 when the body of the tractor is in a substantially horizontal position as shown in Figure 1. Pins 46 are then mounted through the clevises 20 and the flanges 45 to secure the body of the tractor against any pivotable movement relative to the traction means.

Turning next to a description of the power train between the body of the tractor and the traction means and the control linkages therebetween, a universal joint 47 is mounted on the end of the output shaft 16 and is connected to the previously described universal joint 32 to complete the power train from the engine within the body of the tractor to the final drive housing 24 of the traction means. The universal joints 32 and 47 are positioned to substantially intersect the axis through the stub shafts 44. When the body of the tractor is pivoted relative to the traction means the universal joints 32 and 47 will pivot about their various axes of pivoting, each to a degree dependent upon their particular rotational position, and thus it may be seen that the body of the tractor may be pivoted relative to the traction means without disconnecting the power train between the body of the tracor and the traction means. Although, only one method of extending the power train to the traction means in any tilted position of the body without disconnecting the power train from the body or the traction means has been described, it is not intended that the invention be limited to that specific construction.

To operate the clutches and brakes within the final drive housing 24 a pair of levers 50 are provided. Each of the levers 50 comprise three arms 51, 52 and 53 disposed at an angle to each other as can be seen in Figure 4. Each of the levers 50 is pivotally mounted on a shaft 54, and each of the shafts 54 are secured on one side of the final drive housing 24 between the final drive housing 24 and plates 55. The plates 55 are mounted on either side of the final drive housing 24. The shafts 54 are positioned substantially parallel and adjacent to the axis through the stub shafts 44. The upper arms 51 of each of the levers 50 are each connected to a link 48 by means of a ball joint 49. The other end of each link 48 is pivotally connected to a cam assembly 56 by means of a ball joint 64. Each of the cam assemblies 56 is pivotally mounted by means of a pin 57 onto the cover 28 of the final drive housing 24. Each of the operating shafts 33 for the clutches within the final drive housing 24 is provided with a lever 58 which is secured thereon. The free end of each of the levers 58 is formed to have a roller assembly 59 secured thereon and carrying a roller 60. The coiled springs 61 mounted between the cover 28 of the final drive housing 24 and the roller assembly 59 tend to bias the rollers 60 against the cam assembly 56. The clutches within the final drive housing 24 are normally engaged and in that position the levers 58 and the cam assemblies 56 are disposed in the position shown in Figure 6. Moving the links 48 towards the rear of the tractor causes the cam assemblies 56 to pivot, with the cam assembly 56 on the right side of the tractor pivoting in a clockwise direction when viewed from above, and with the cam assembly 56 on the left side of the tractor pivoting in a counter-clockwise direction when viewed from above. Each of the respective levers 58 is then caused to pivot toward the center of the tractor to disengage the clutches within the final drive housing 24. Each of the cam assemblies 56 is formed to have a circular shoulder 62 upon which the rollers 60 will ride as the cam assemblies 56 are further pivoted. The shoulders 62 of the cam assemblies 56 maintain the clutches within the final drive housing 24 disengaged as the links 48 are moved further rearwardly pivoting the cam assemblies 56. The purpose of the shoulders 62 on the cam assemblies 56 is to permit the operation of the clutches and the brakes for each sprocket 31 by a single operating lever with the clutches disengaged before the brakes may be applied.

The lower arm 52 of each of the levers 50 is pivotally connected to the rod end of a single acting hydraulic ram 65. The head end of each of the hydraulic rams 65 is pivotally mounted to the side of the final drive housing 24 by means of pivotal mounting means 66. When the hydraulic rams 65 are operated, the levers 50 will be pivoted to move the links 48 toward the rear of the tractor. The coiled springs 61, previously described, will return the levers 50 to the normal unoperated position such as shown in Figure 4 to cause the hydraulic rams 65 to be retracted to the unoperated position. The lower arm 53 of each of the levers 50 is pivotally mounted to a link 67. The other end of each of the links 67 extends upwardly into the body of the tractor and is pivotally mounted to one leg of a bell crank 68. Each of the bell cranks 68 is pivotally mounted within the body of the tractor at a convenient position, and the other leg of each of the bell cranks 68 is pivotally connected to a link 69. The other end of each of the links 69 is pivotally mounted to another bell crank 70. The bell cranks 70 are also mounted at a convenient position within the body of the tractor forwardly and below the operator's compartment 12. The other leg of each of the bell cranks 70 is pivotally connected through a link 71 to the casing of a hydraulic valve 72. The plunger of each of the hydraulic valves 72 is pivotally mounted to an arm 73. Each arm 73 is secured to the hub of one of the operating levers 14 which are pivotally mounted at the forward wall of the operator's compartment 12. Each of the valves 72 and the corresponding hydraulic ram 65 form part of a hydraulic servo-mechanism. This hydraulic servo-mechanism may be of any suitable type well known in the art, and further comprises hydraulic conduits, and hydraulic pump and reservoir means (not shown). With the hydraulic servo-mechanism shown in the drawings, as one of the levers 14 associated with one of the valves 72 is operated to a certain degree, that hydraulic valve 72 will be opened to cause a flow of hydraulic fluid into the associated hydraulic ram 65. That hydraulic ram 65 will then pivot lever 50 to in turn move links 48 and 67. This movement of link 67, operating through the described linkage, will cause a corresponding movement of the hydraulic valve 72 to close that hydraulic valve 72. Thus, the described linkage in cooperation with the other elements of the arrangement provides for a correspondence between the movement of the levers 14 and 50. As is well known in the art, these conventional hydraulic servo-mechanisms reduce the force that would be required by the operator of the loader in moving the lever 14 to cause a corresponding movement to the lever 50 if that movement were to be done only through the mechanical linkage. Since the hydraulic rams 65 are single acting, the coiled springs 61 are used to return the levers 50 to normal. With the above described arrangement it has been found that when the body of the tractor is pivoted to a position such as shown in Figure 3 the described linkages between the operator's compartment 12 and the clutches in the final drive housing 24 will pivot relative to the traction means and the body, to thereby enable the body of the tractor to be pivoted as described without disconnecting the described linkages at any point. Although, only one arrangement for the clutch linkages has been described, it is not intended that the invention be limited to that specific arrangement.

For operating the brakes within the final drive housing 24, a pair of levers 75 are provided. Each of the levers 75 is also mounted on one of the shafts 54 adjacent one of the levers 50, as can be seen in Figure 5. Each of the levers 75 has an upper arm 76 and a lower arm 77. Each of the upper arms 76 is provided with a stop or pad 78. Each of the stops 78 is positioned to extend into the path of travel of the associated lever 50 and is cooperable with a pad 79 secured to the upper arm 51 of that lever 50, as can be seen in Figure 6. Thus for example, when the lever 50 on the right side of the tractor is pivoted in a counter-clockwise direction as viewed in Figure 4, the pad 79 on the upper arm 51 will abut against the pad 78 on the upper arm 76 of the lever 75 after a certain arc travel of the lever 50 and will then pivot the lever 75 in a counter-clockwise direction as seen in Figure 4. The point at which the pad 79 will abut the pad 78 is selected as that point at which the clutches are completely disengaged through movement of the link 48 when the associated roller 60 will be riding upon the circular shoulder 62 of the associated cam assembly 56. The lower arm 77 of each of the levers 75 is pivotally connected to one end of a link 80. The other end of each of the links 80 is pivotally connected to one end of a brake arm 81. As previously described, the brakes within the final drive housing 24 are operated by the shafts 34 extending from each side of the final drive housing 24. An adjusting bracket 82 is keyed to each of the shafts 34. A second brake arm 83 is provided and the brake arms 81 and 83 are interconnected as a bell crank. The outer end of the arm 83 is adjustably secured to the adjusting bracket 82. When the brake arm 81 is pivoted in a clockwise direction as viewed in Figure 4, the brake within the final drive housing 24 associated therewith is applied. The adjusting bracket 82 and the brake arm 83 permit an external adjustment of the brakes to compensate for brake wear. A pair of coiled springs 84 are also provided, and each of the coiled springs 84 are connected between the final drive housing 24 and the upper end of the brake arm 81 to bias the brake shaft 34 associated therewith to a position corresponding to an unoperated condition of the brakes within the final drive housing 24. Thus it may be readily seen that when the lever 75 on the right side of the tractor as shown in Figure 4 is pivoted in a counter-clockwise direction by the lever 50 after the clutch associated therewith is disengaged, the arm 77 operating through the link 80, the brake arm 81 and the brake arm 83 will pivot the adjusting bracket 82 in a clockwise direction as viewed in Figure 4 to apply the brake associated therewith. To further strengthen the connection between the brake arm 81 and the brake shaft 34, additional means may be provided to directly secure the brake arm 81 to the brake shaft 34 in any adjusted position. It is further evident that when the lever 50 is restored to the normal position as shown in Figure 4, the coiled spring 84 on the right side of the tractor will restore the brake arms 81 and 83, the adjusting bracket 82, the brake shaft 34 and the lever 75 associated therewith to the normal unoperated position as shown in Figure 4. It has been found with the arrangement described above that the body of the tractor may be pivoted to a position such as shown in Figure 4 without effecting the described elements for the operation of the brakes and without requiring the disconnection of any of the linkages for operation of the brakes. Although, only one arrangement for the brake linkages has been described, it should not be inferred that the invention be limited to that specific arrangement.

In summary it should be noted that the present invention discloses an arrangement for a tractor wherein a power train is extended from the body of the tractor to the traction means, wherein operative means are provided within the operator's compartment in the body of the tractor for operating clutch and brake elements within the traction means, and importantly, wherein the body of the tractor is pivotable relative to the traction means to accomplish a certain result to be described below and without the necessity for disconnecting any of the described operating and control means for the tractor.

Turning next to a detailed description of the earthworking tool arrangement of the present invention and the cooperation of the tool arrangement with the previously described tractor, a boom 90 is provided in duplicate portions disposed on each side of the body of the tractor. One end of the boom 90 is pivotally mounted to the body of the tractor by means of pivotal mounting means 91. The boom 90 is positioned to extend forwardly of the tractor and the forward end of the boom 90 is provided with a pair of skid shoes 92 and extending links 93. A bucket 94 of any type well known in the art is pivotally mounted to the extending links 93 through pivotal mounting means 95. To raise and lower the boom 90 a pair of hydraulic rams 96 are provided. Each of the hydraulic rams 96 is pivoted at the head end thereof to one side of the frame 10 through pivotal mounting means 97. The rod end of each of the hydraulic rams 96 is pivotally mounted to one portion of the boom 90 intermediate the ends thereof through a bracket 98 and pivotal mounting means 99. To control the position of the bucket 94 relative to the boom 90 a linkage arrangement comprising a pair of hydraulic rams 100, a pair of levers 101, and a pair of links 102 is provided. Each of the hydraulic rams 100 is pivotally mounted at the head end thereof to the body of the tractor through pivotal mounting means 103. The rod end of each of the hydraulic rams 100 is pivotally mounted to one end of one of the levers 101 by pivotal mounting means 104. Each of the levers 101 is pivotally mounted intermediate the ends thereof to one portion of the boom 90 intermediate the ends thereof through a bracket 105 and pivotal mounting means 106. The other end of each lever 101 and one end of one of the links 102 is pivotally interconnected by means of pivotal mounting means 107. The other end of each link 102 is pivotally mounted to the bucket 94 through pivotal mounting means 108. Hydraulic fluid conduits, pumps, and valves (not shown) are provided for operation of the hydraulic rams 96 and 100.

In operation, the hydraulic rams 96 are operated to properly position the height of the bucket 94 for digging and the tractor is then moved to cause the bucket 94 to dig into any material being dug. The hydraulic rams 100 are operable to control the digging angle of the bucket, and when substantially extended cause the bucket 94 to be pivoted to a carrying position. To dump the bucket 94, the hydraulic rams 100 are substantially retracted.

Referring next to a detailed description of the operation of the earth-working tool in cooperation with the tractor to perform additional functions, it has been found that if the pins 46 are withdrawn from the clevises 20 and the flanges 45, if further the bucket 94 is secured against any upward movement, and if the hydraulic rams 96 are then extended, the body of the tractor will be pivoted to raise the rear half of the tractor above the final drive housing 24 and to lower the forward end of the body of the tractor between the track frames 21. This action can be continued until the body of the tractor reaches a position such as shown in Figure 3. This permits easy access to be had to the top of the final drive housing 24.

In the structure of a tractor loader as described above it is desirable to gain access to the top of the final drive housing by some simple means. The clutches and brakes within the final drive housing often require servicing and repair or replacement. This may be easily accomplished when the body of the tractor is in a position such as shown in Figure 3. The inspection covers 63 can be removed for minor adjustments within the final drive housing 24. To gain full access to the clutches and brakes within the final drive housing 24, it is merely necessary to disconnect the links 48 from the cam assemblies 56, and to then remove the cam assemblies 56, the levers 58, and to then unbolt and remove the cover 28 of the final drive housing 24.

Rather than secure the bucket 94 against any upward movement, it has been found that by pivotally mounting a link 110 to the boom 90 through mounting means 111 and to the track frame 21 on the right side of the tractor through mounting means 112 when the body is in the horizontal position, and by then extending the hydraulic rams 96, the body of the tractor will be pivoted to raise the rearward end thereof to the position shown in Figure 3. A link 113 is then mounted at one end thereof to the clevis 20 by means of a pin 114 and at the other end thereof to the flange 45 on the right side of the tractor by means of a pin 115 to secure the body of the tractor against any accidental lowering of the rearward portion of the body through a contraction of the rams 96. After the clutches and brakes within the final drive housing 24 have been serviced or adjusted the cover 28 of the final drive housing 24 may be replaced, the levers 58 and the cam assemblies 56 replaced, and the links 48 reconnected to the cam assemblies 56. The link 113 is then removed and the body of the tractor is turned to the horizontal position by a contraction of the rams 96. Replacement of the pins 46 and removal of the link 110 returns the loader to normal.

Having described the invention, what is considered new and desired to be protected by Letters Patent is:

1. In combination, tractor traction means including elements normally requiring periodic servicing, a tractor body carrying a tractor engine, pivot means mounting said tractor body on said tractor traction means for pivoting about a transverse axis positioned substantially vertically below and forwardly of the center of gravity of said body sufficiently to compensate for the weight of any forwardly extending tool means carried by said body to provide a balanced unit, said pivot means being further formed to provide for pivoting of said body to one position to align said body relative to said traction means and with said body covering said elements and to another position to uncover said elements to an extent permitting servicing of said elements, and means providing a power connection from said engine to said traction means in any pivoted position of said body.

2. In combination, tractor traction means including elements mounted in the rear thereof and normally requiring periodic servicing, a tractor body, pivot means mounting said tractor body on said tractor traction means to provide for pivoting of said body to one position to align said body relative to said traction means with said body covering said elements and to another position to move said body to uncover said elements to an extent permitting servicing of said elements, an earth-working tool operatively carried by said body and extending forwardly of said body, and a removable link mounted between said earth-working tool and said traction means for causing a pivoting of said body relative to said traction means and said tool responsive to an operation of said tool.

3. In a tractor loader, traction means having a final drive housing carried therein, a tractor body, means pivotally mounting said body on said traction means for pivoting about a transverse axis positioned substantially vertically below and forwardly of the center of gravity of said body sufficiently to compensate for the weight of any forwardly extending tool means carried by said body to provide a balanced unit, and so that when said body is in a substantially horizontal position said final drive housing is covered by a portion of said body, said last mentioned means arranged so that said body is pivotable relative to said traction means to uncover said final drive housing to an extent permitting servicing within said final drive housing.

4. In a tractor loader, traction means having a final drive housing carried therein, a tractor body carrying a tractor engine, means pivotally mounting said body on said traction means for pivoting about a transverse axis positioned substantially vertically below and forwardly of the center of gravity of said body sufficiently to compensate for the weight of any forwardly extending tool means by said body to provide a balanced unit, and so that when said body is in a substantially horizontal position said final drive housing is covered by a portion of said body, said last mentioned means further arranged so that said body is pivotable to uncover said final drive housing to an extent permitting servicing within said final drive housing from the upper surface thereof, and means providing a power connection from said tractor engine to said final drive housing in any pivoted position of said tractor body relative to said traction means.

5. In a tractor loader, traction means having a final drive housing carried therein, a tractor body, means pivotally mounting said body on said traction means so that when said body is in a substantially horizontal position said final drive housing is covered by a portion of said body, said last mentioned means arranged so that said body is pivotable relative to said traction means to uncover said final drive housing to an extent permitting servicing within said final drive housing, an earth-working tool operatively carried by said body, and means mountable in cooperation with said traction means and said earth-working tool to enable operation of said earth-working tool to pivot said tool and said body relative to said traction means to an extent permitting servicing within said final drive housing.

6. In a tractor loader, traction means having a final drive housing carried substantially at the rear end thereof, a tractor body having an engine compartment carried substantially on the rear portion of said body and having an operator's compartment disposed forwardly of said engine compartment, an engine secured in said engine compartment means pivotally mounting said body on said traction means on a transverse axis below said operator's compartment so that when said body is in a substantially horizontal position said final drive housing is covered by said engine compartment and so that said body and any earth-working tool carried thereby to extend forwardly thereof forms a substantially balanced unit on said transverse axis, said last mentioned means further arranged so that said body is pivotable relative to said traction means to raise said engine compartment above said final drive housing to an extent permitting servicing within said final drive housing.

7. In a tractor loader as claimed in claim 6, wherein removable means is provided connected between said body and said traction means for manually securing said body in a certain position relative to said traction means.

8. In a tractor loader, traction means having a final drive housing carried substantially at the rear end thereof, a tractor body having an engine compartment carried substantially on the rear portion of said body and having an operator's compartment disposed forwardly of said engine compartment, an engine secured in said engine compartment means pivotally mounting said body on said traction means on a transverse axis below said operator's compartment so that when said body is in a substantially horizontal position said final drive housing is covered by said engine compartment and so that said body and any earth-working tool carried thereby to extend forwardly thereof forms a substantially balanced unit on said transverse axis, said last mentioned means further arranged so that said body is pivotable relative to said traction means to raise said engine compartment above said final drive housing to an extent permitting servicing within said final drive housing, and means providing a power connection from said engine to said final drive housing in any pivoted position of said body relative to said traction means.

9. In a tractor loader, traction means having a final drive housing carried substantially at the rear end thereof, a tractor body having an engine compartment carried substantially on the rear portion of said body and having an operator's compartment disposed forwardly of said engine compartment, an engine secured in said engine compartment control means mounted in said operator's compartment, means pivotally mounting said body on said traction means on a transverse axis below said operator's compartment so that when said body is in a substantially horizontal position said final drive housing is covered by said engine compartment and so that said body and any earth-working tool carried thereby to extend forwardly thereof forms a substantially balanced unit on said transverse axis, said last mentioned means further arranged so that said body is pivotable relative to said traction means to raise said engine compartment above said final drive housing to an extent permitting servicing within said final drive housing, and linkage means for operatively connecting said control members to said final drive housing in any pivoted position of said body relative to said traction means.

10. In a tractor loader, traction means having a final drive housing carried substantially at the rear end thereof, said final drive housing including elements normally requiring periodic servicing, a tractor body having an engine compartment carried on the rear portion of said body and having an operator's compartment disposed forwardly of said engine compartment, an engine secured in said operator's compartment said operator's compartment carrying control members for controlling said elements in said final drive housing, means pivotally mounting said body on said traction means on a transverse axis below said operator's compartment so that when said body is in a substantially horizontal position said final drive housing is covered by said engine compartment and so that said body and any earth-working tool carried thereby to extend forwardly thereof forms a substantially balanced unit on said transverse axis, said last mentioned means further arranged so that said body is pivotable relative to said traction means to raise said engine compartment above said final drive housing to an extent permitting servicing of said elements within said final drive housing, and means providing a power connection from said engine to said final drive housing in any pivoted position of said body relative to said traction means, and linkage means for operatively connecting said control members to said elements in said final drive housing in any pivoted position of said body relative to said traction means.

11. In a tractor loader, traction means having a final drive housing carried substantially at the rear end thereof, a tractor body having an engine compartment disposed substantially at the rear portion of said body and having an operator's compartment disposed forwardly of said engine compartment, an engine secured in said engine compartment means pivotally mounting said body on said traction means on a transverse axis below said operator's compartment so that when said body is in a substantially horizontal position said final drive housing is covered by said engine compartment and so that said body and any earth-working tool carried thereby to extend forwardly thereof forms a substantially balanced unit on said transverse axis, said last mentioned means further arranged so that said body is pivotable relative to said traction means to raise said engine compartment above said final drive housing to an extent permitting servicing of said final drive housing, and means mounted between said traction means and said body for pivoting said body relative to said traction means to an extent permitting servicing within said final drive housing.

12. In a tractor loader, traction means having a final drive housing carried substantially at the rear end thereof, a tractor body having an engine mounted on the rear portion of said body and having an operator's compartment disposed forwardly of said engine compartment, means adjustably mounting said body relative to said traction means, power train means interconnecting said engine and said final drive housing, said power train means arranged to maintain said connection in any adjusted position of said body relative to said traction means, control members mounted in said operator's compartment, linkage means connecting said control members to said final drive housing, said linkage means arranged to maintain said connection in any adjusted position of said body relative to said traction means.

13. In a tractor loader, traction means having a final drive housing carried substantially at the rear portion thereof, a tractor body including an engine compartment carried substantially at the rear portion of said body, and an operator's compartment carried by said body and disposed forwardly of said engine compartment, means pivotally mounting said body on said traction means so that when said body is in a substantially horizontal position said final drive housing is covered by said engine compartment, said last mentioned means arranged so that said body is pivotable relative to said traction means to raise said engine compartment from said final drive housing to an extent permitting servicing within said final drive housing, and an earth-working tool operatively carried by said body for pivotal movement relative thereto and extending forwardly of said body and operable as a lever for pivoting said body to raise said engine compartment from said final drive housing when said tool is secured against upward movement relative to the traction means and the tool is operated.

14. In a tractor loader, traction means, a tractor body including an engine compartment carried substantially at the rear portion of said body and an operator's compartment carried by said body and disposed forwardly of said engine compartment, an engine mounted in said engine compartment, a pair of axially spaced stub shafts transversely carried by said traction means, a pair of axially spaced bearings transversely carried by said body and mounted in cooperation with said stub shafts so that said body is substantially carried by said stub shafts on said traction means and so that said body is pivotable relative to said traction means, an earth-working tool operatively carried by said body and extending forwardly of said body, said stub shafts and said bearings arranged so that the center of gravity of said body and said earth-working tool is disposed substantially vertically above the axis of said stub shafts.

15. In a tractor loader, traction means comprising a pair of spaced apart crawler track mechanisms, a final drive housing carried between said crawler track mechanisms substantially at the rear thereof, and a pair of transverse supporting beams mounted in a spaced apart relationship to each other between said crawler track mechanisms, a second pair of beams mounted in a spaced apart relationship to each other transversely of and on the upper surfaces of said pair of transverse supporting beams, a pair of axially spaced stub shafts carried by said second pair of beams, a tractor body including an engine compartment carried substantially at the rear portion of said body and an operator's compartment carried by said body and disposed forwardly of said engine compartment, an engine mounted in said engine compartment, a pair of axially spaced bearings transversely carried by said body and mounted in cooperation with said stub shafts so that said body is substantially carried by said stub shafts on said crawler track mechanisms and so that said body is pivotable relative to said crawler track mechanisms, said stub shafts and said bearings arranged so that said body is pivotable relative to said crawler track mechanisms to raise said engine compartment from said final drive housing to an extent permitting servicing within said final drive housing, and a power connection between said engine and said final drive housing, said power connection being formed and arranged to deliver power to said final drive housing in any pivoted position of said body relative to said crawler track mechanisms.

16. In a tractor loader, a pair of track frames, a pair of driven sprockets rotatively mounted at one end of said track frames, a final drive housing assembly having clutches and brakes mounted therein, said final drive housing mounted to said track frames in a position between said track frames at said one end with said clutches and brakes operatively connected to said driven sprockets, a main frame pivotally mounted substantially longitudinally centrally thereof to said track frames in a position between said track frames to extend over said final drive housing when said main frame is horizontally positioned and to permit free access to the top of said final drive housing when said main frame is positioned in a downward inclined direction toward the other end of said track frames.

References Cited in the file of this patent

UNITED STATES PATENTS

| | | |
|---|---|---|
| 2,002,474 | Johnson et al. | May 21, 1935 |
| 2,141,267 | Dillon | Dec. 27, 1938 |
| 2,344,821 | Kiesel | Mar. 21, 1944 |
| 2,694,581 | Helmle | Nov. 16, 1954 |
| 2,699,615 | Malvese | Jan. 18, 1955 |
| 2,778,131 | Herr | Jan. 22, 1957 |

FOREIGN PATENTS

| | | |
|---|---|---|
| 346,464 | Great Britain | Apr. 16, 1931 |
| 1,037,500 | France | Apr. 29, 1953 |